United States Patent
Maeno et al.

(10) Patent No.: US 7,140,603 B2
(45) Date of Patent: Nov. 28, 2006

(54) VIBRATION DAMPING DEVICE HAVING STOPPER STRUCTURE

(75) Inventors: Hajime Maeno, Kasugai (JP); Atsushi Muramatsu, Komaki (JP); Nobuhiro Yasumuro, Yokohama (JP); Naoki Kaneda, Kawasaki (JP); Shigeki Okai, Atsugi (JP)

(73) Assignees: Tokai Rubber Industries, Ltd., Komaki (JP); Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/873,778

(22) Filed: Jun. 21, 2004

(65) Prior Publication Data
US 2004/0262831 A1 Dec. 30, 2004

(30) Foreign Application Priority Data
Jun. 30, 2003 (JP) .............................. 2003-188536

(51) Int. Cl.
*F16F 15/00* (2006.01)
(52) U.S. Cl. .............................................. 267/140.13
(58) Field of Classification Search ........... 267/140.13, 267/140.11, 292–294, 141, 153, 140.2–140.5, 267/220; 180/300, 312, 311, 902; 248/634, 248/638, 636, 562
See application file for complete search history.

(56) References Cited

U.S. PATENT DOCUMENTS

| | | | | |
|---|---|---|---|---|
| 2,900,162 A | * | 8/1959 | Crede et al. ............ | 267/140.13 |
| 4,842,258 A | | 6/1989 | Misaka et al. ........... | 267/140.1 |
| 5,176,369 A | * | 1/1993 | Ito ........................ | 267/140.13 |
| 5,183,243 A | * | 2/1993 | Matsumoto ............ | 267/140.13 |
| 5,269,498 A | * | 12/1993 | Bretaudeau et al. ... | 267/140.13 |
| 5,775,666 A | | 7/1998 | Tsukamoto et al. ......... | 248/364 |
| 6,176,477 B1 | * | 1/2001 | Takeo et al. ........... | 267/140.11 |
| 6,352,248 B1 | | 3/2002 | Hamaekers et al. | |
| 6,517,061 B1 | * | 2/2003 | Yamamoto et al. ..... | 267/140.11 |
| 6,527,262 B1 | * | 3/2003 | Hagino et al. ......... | 267/140.14 |
| 6,558,737 B1 | | 5/2003 | Stenzel et al. | |
| 6,631,894 B1 | | 10/2003 | Takashima et al. | |
| 6,659,436 B1 | * | 12/2003 | Muramatsu et al. ... | 267/140.13 |
| 6,808,167 B1 | * | 10/2004 | Kodama ................. | 267/140.13 |

(Continued)

FOREIGN PATENT DOCUMENTS

EP   0187188 A   6/1985

(Continued)

OTHER PUBLICATIONS

Office Action mailed Apr. 7, 2005 in U.S. Appl. No. 10/873,605.

(Continued)

*Primary Examiner*—Christopher P. Schwartz
(74) *Attorney, Agent, or Firm*—Beyer Weaver & Thomas LLP

(57) ABSTRACT

A vibration damping device having a stopper structure includes: a rubber elastic body of generally frustoconical configuration overall; a first mounting member formed independently of the rubber elastic body, and directly or indirectly superimposed on the rubber elastic body in an external load input direction; and a second mounting member including a cylindrical portion that is bonded to a large diameter side outer circumferential surface of the rubber elastic body. A first and second abutting portions of the first and second mounting members are situated to be opposed to each other in a rebound direction with a given distance interposed therebetween, and a stop rubber is disposed between the first and second abutting portions so that the first and second abutting portions come into abutting contact with each other in a cushion-wise fashion, via the stop rubber to thereby provide a stopper structure.

8 Claims, 3 Drawing Sheets

U.S. PATENT DOCUMENTS

2003/0075848 A1* 4/2003 Okanaka et al. ....... 267/140.13
2004/0201150 A1* 10/2004 Okanaka et al. ....... 267/140.11
2004/0262830 A1* 12/2004 Maeno et al. ............ 267/140.4
2004/0262831 A1* 12/2004 Maeno et al. .......... 267/140.13

FOREIGN PATENT DOCUMENTS

| FR | 2856763 | * | 12/2004 |
| JP | 62196433 A | | 8/1987 |
| JP | 3-30736 | | 5/1991 |
| JP | 05044770 A | | 2/1993 |
| JP | 06294437 A | | 10/1994 |
| JP | 9-66721 | | 3/1997 |

OTHER PUBLICATIONS

Preliminary Search Report mailed Jul. 6, 2005 in corresponding French application FR 0407122.

* cited by examiner

VIBRATION DAMPING DEVICE HAVING STOPPER STRUCTURE

INCORPORATED BY REFERENCE

The disclosure of Japanese Patent Application No. 2003-188536 filed on Jun. 30, 2003 including the specification, drawings and abstract is incorporated herein by reference in its entirety.

BACKGROUND OF THE INVENTION

1. Field of the Invention

The present invention relates generally to vibration damping devices installed between components to be connected together in vibration isolating fashion, more particularly to a vibration damping devices suitably usable as an engine mount, a body mount or other mounts for use in automobiles.

2. Description of the Related Art

There have been widely used in a variety of fields vibration damping devices each having a rubber elastic body disposed between first and second mounting members fixable to components connected together in vibration isolating fashion. As one type of such vibration damping devices is known a vibration damping device including: a rubber elastic body of generally frustoconical configuration in its entirety; a first mounting member fixedly secured to a small-diameter side central portion of the rubber elastic body; and a second mounting member having a cylindrical portion that is secured to a large-diameter side outer circumferential surface of the rubber elastic body, thereby providing a construction wherein the first and second mounting members directly elastically connected to each other via the rubber elastic body (see JP-A-9-66721, for example).

The known vibration damping device is able to advantageously obtain a volume of the rubber elastic body, and to prevent excess strain induced in the rubber elastic body by restricting elastic deformation of the large-diameter outer circumferential surface of the rubber elastic body with the second mounting member attached thereon. In particular, the known vibration damping device is capable of advantageously exhibiting an enhanced anti-load performance as well as durability with respect to input load in a direction in which the small diameter end face and large diameter end face move toward each other. For the aforesaid advantages, the known vibration damping device has been examined to use as an engine mount or similar mounts adapted to bear initial or static load.

However, the conventional vibration damping device having the rubber elastic body of frustoconical shape inevitably suffers from tensile stress that is directly generated in the rubber elastic body when being subjected to input load in a rebound direction where the small and large diameter end faces move away from each other, i.e., in the opposite direction to the initial load input direction. As a result, the rubber elastic body is prone to suffer from cracks or other defects due to the input load in the rebound direction, leading to a likelihood of considerable deterioration in durability.

SUMMARY OF THE INVENTION

It is therefore one object of this invention to provide a vibration damping device having a frustoconical rubber elastic body, which is novel in construction and capable of exhibiting excellent durability and anti-load performance, while eliminating or minimizing tensile stress induced in the rubber elastic body due to input load in the rebound direction.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention is a vibration damping device having a stopper structure, comprising: (a) a rubber elastic body of generally frustoconical configuration overall; (b) a first mounting member formed independently of the rubber elastic body, and directly or indirectly superimposed on the rubber elastic body in an external load input direction so that an input external load is exerted on a central portion of the rubber elastic body where a small diameter portion of the rubber elastic body is included; (c) a second mounting member including a cylindrical portion that is bonded to an outer diameter side outer circumferential surface of the rubber elastic body so as to exert the input external load to an outer circumferential portion of the rubber elastic body; (d) a first abutting portion of the first mounting member and a second abutting portion of the second mounting member, which are situated to be opposed to each other in a rebound direction of the external force input direction with a given distance interposed between the first and second abutting portions; and (e) a stop rubber disposed between the pair of abutting portions of the first and second mounting members so as to provide a stopper structure in which the first and second abutting portions are brought into abutment with each other in a cushion-wise manner to thereby limit an amount of displacement between the first and second mounting members relative to each other in the rebound direction.

In the vibration damping device of construction according to this mode, when the vibration damping device is subjected to input vibration in a bound direction in which the small and large diameter end faces of the rubber elastic body move toward each other, the first and second mounting members are held in a connected state where they are mutually elastically connected to each other via the rubber elastic body. With this arrangement, the vibration damping device is capable of providing excellent anti-load performance against external load exerted between the first and second mounting members, while exhibiting vibration damping effect with respect to vibrational load exerted between the first and second mounting members based on elasticity of the rubber elastic body.

On the other hand, when the vibration damping device is subjected to input vibration in a rebound direction in which the small and large diameter end faces of the rubber elastic body move away from each other, the first mounting member is moved substantially away from the rubber elastic body, thereby avoiding tensile stress induced in the rubber elastic body, and assuring excellent durability of the rubber elastic body in the vibration damping device.

Furthermore, since the stopper structure in the rebound direction (hereinafter referred to as "the rebound stopper structure" where appropriate) is provided in the vibration damping device of this mode, displacement of the first mounting member relative to the rubber elastic body is not permitted completely freely, but limited in a cushion-wise manner. With the help of this arrangement, the first mounting member is advantageously held in a state of being superimposed on the rubber elastic body, even when the vibration damping device is subjected to external load applied thereto alternately in the bound and rebound directions, or when subjected to external load applied thereto in an axis-perpendicular direction of the rubber elastic body.

In the present mode, the cylindrical portion of the second mounting member may be bonded to the rubber elastic body through vulcanization of a rubber material for forming the rubber elastic body. Alternatively, a metallic fixture may be bonded through vulcanization to the rubber elastic body, and secured in press fit into the cylindrical portion of the second mounting member in order to bond the second mounting member to the rubber elastic body.

A variety of structure may be employed for permitting the first mounting member to be superimposed on the rubber elastic body in the present mode. For instance, the first mounting member may be directly superimposed on the small-diameter end face of the rubber elastic body, whereby external load is directly exerted via the first mounting member on the central portion of the rubber elastic body where the small diameter end face is situated. Alternatively, separate member is bonded to the small-diameter or central portion of the rubber elastic body, and the first mounting member may be superimposed on the separate member in the bound direction in which external load is exerted on the rubber elastic body so that external load is indirectly via the first mounting member on the central portion of the rubber elastic body.

A second mode of the invention is a vibration damping device according to the first mode, wherein the first mounting member is disposed being superimposed on a small diameter end face of the rubber elastic body. This mode makes it possible to apply the principle of the invention to an engine mount for mounting a power unit on a body of an automobile in a superimposing fashion.

A third mode of the invention is a vibration damping device according to the first or second mode, further comprising a pressure receiving member that is bonded to a small diameter portion of the rubber elastic body, and the first mounting member is superimposed on the pressure receiving member so that external force is exerted via the first mounting member on the central portion of the rubber elastic body. In the vibration damping device of construction according to the present mode, the pressure receiving member is bonded to the small diameter portion of the rubber elastic body, and the first mounting member is superimposed on the pressure receiving chamber, so that external force is introduced via the first mounting member to the central portion of the rubber elastic body through the pressure-receiving member. Therefore, where the first mounting member is superimposed on the rubber elastic body in the external load input direction, the use of the pressure receiving member formed of rigid materials such as rigid synthetic resin or metal, makes it possible to enhance stability in shape or other factors of the portion on which the first mounting member is superimposed.

The pressure receiving member may have a variety of shapes as long as it provides a portion to be superimposed against the first mounting member. For instance, the pressure receiving member may have a plate shape, and may be adapted to be entirely or partially superimposed against the first mounting member, or alternatively have an overall rod shape and be superimposed at any axial portion thereof against the first mounting member. Also, a variety of materials may be employed for forming the pressure receiving chamber, as long as these exhibit rigidity enough for standing against impact exerted thereon when the first mounting member once moved away from the rubber elastic body, i.e., the pressure receiving member is again brought into contact with the pressure receiving member. Preferably, a rigid material, e.g., rigid synthetic resin or metal is employed.

A fourth mode of the invention is a vibration damping device according to the third mode, wherein the pressure receiving member is disposed at a central portion of the rubber elastic body, and axially extending through the rubber elastic body so as to project out from a large-diameter end face of the rubber elastic body, and wherein the first mounting member is superimposed on a projecting end portion of the pressure receiving member from the side of the rubber elastic body so that the external load is indirectly exerted on the central portion of the rubber elastic body via the pressure receiving member. In the rubber elastic body of construction according to the present invention, when the first mounting member is superimposed on the projecting end of the pressure-receiving member situated on the large-diameter side of the rubber elastic body from the rubber elastic body side, the external load will be indirectly exerted on the central portion of the rubber elastic body via the pressure receiving member. For this advantage, the present invention may be applicable to an engine mount of hanging type wherein the mount is installed for supporting a power unit on a body in a hanging fashion, for example.

A fifth mode of the invention is a vibration damping device according to the third or fourth mode, wherein an overlapping face area of the first mounting member against the pressure receiving member is larger than an overlapping face area of the pressure receiving member against the first mounting member. With the help of the first mounting member overlapping face that is made larger than the pressure receiving member overlapping face, the first mounting member is surely held in a state where it is entirely held in contact with the pressure receiving member, even if the first and second mounting member are displaced relative to each other in the axis-perpendicular direction of the cylindrical portion of the second mounting member. This arrangement makes it possible to substantially conform the external load input direction against the rubber elastic body to the axial direction of the cylindrical portion of the second mounting member, thereby permitting a stable alignment of the load or vibration input direction to the axial direction of the cylindrical portion of the second mounting member. Therefore, the vibration-damping device of construction of this mode is capable of avoiding variation or eccentricity in the external load input direction to the rubber elastic body due to the structure where the first mounting member is superimposed on the rubber elastic body, making it possible for the vibration damping device to exhibit desired damping effect with stability.

A sixth mode of the invention is a vibration damping device according to any one of the first through fifth modes, wherein the second mounting member includes an extension portion extending axially outwardly from the cylindrical portion of the second mounting member, which is fixed onto the large diameter outer circumferential surface of the rubber elastic body, toward the first mounting member, and the second abutting portion of the second mounting member is formed by an distal end portion of the extension portion of the second mounting member that is situated axially above and opposed to the first abutting portion of the first mounting member while the first mounting member is elastically positioned relative to the extension portion of the second mounting member in an axis-perpendicular direction of the cylindrical portion of the second mounting member via the stop rubber disposed between the first abutting portion and the second abutting portion. With this arrangement, since the second abutting portion is formed by utilizing the distal end portion of the extension portion disposed about the first mounting member, the stop rubber disposed between the first and second abutting portions can be further utilized to elastically position the first and second mounting members relative to each other in the axis-perpendicular direction of the cylindrical portion of the second mounting member. For instance, the stop rubber is desirably configured, e.g., to an annular block configuration, in order to provide a cylindrical outer circumferential surface, while the extension portion of the second mounting member is desirably configured, e.g., to a cylindrical configuration, in order to provide a cylindrical inner circumferential surface, and the stop rubber and the extension portion are situated in a concentric relationship with each other. This arrangement permits a stably positioning of the first and second mounting members in a substantially concentric fashion, making it possible to conform the load or vibration input direction approximately to the axial direction of the cylindrical portion of the second mounting member.

A seventh mode of the invention is a vibration damping device according to any one of the first through sixth modes, further comprising: a fluid chamber partially defined by the rubber elastic body and filled with a non-compressible fluid sealed therein, and the device exhibits vibration damping effect based on flow action of the non-compressible fluid generated within the fluid chamber during input of vibrational load. With the vibration damping device of construction according to this mode, the first mounting member is formed separately from and superimposed on the rubber elastic body that partially defines the fluid chamber, thereby effectively preventing the non-compressible fluid from functioning as a restricting member for preventing elastic deformation of the rubber elastic body, during input of large load in the rebound direction in which the first and second mounting members are moved away from each other. By means of this arrangement, the vibration damping device is free from or less suffers from possible drawbacks such as increase in dynamic spring constant of the rubber elastic body, and resultant deterioration of its vibration damping performance.

The vibration damping device of this mode is capable of preventing generation of air bubbles in the non-compressible fluid due to separation of air component contained in the non-compressible fluid from the fluid, and avoiding noises and impact caused by appearance and disappearance of the bubbles. Also, the vibration-damping device of this mode is free from the problem of insufficient increase in interior pressure of the fluid chamber which may be occurred by means of compression of the bubbles during input of vibrational-load, allowing the vibration damping device to be free from malfunction of its intended damping performance.

The principle of the present invention is effectively applied especially in a vibration damping devices that is designed in a presumption that it bears the external vibrational load applied thereto in the axial direction of the rubber elastic body or the cylindrical portion of the second mounting member. In this vibration damping device, if the first mounting member is independently formed of the rubber elastic body, no or few defect or problem is caused by input vibration or load in the axis-perpendicular direction. Therefore, with the simple and unique construction of this mode, i.e., with the first mounting member being formed independently of and superimposed on the rubber elastic body, it is possible to provide a vibration-damping device with high utility.

BRIEF DESCRIPTION OF THE DRAWINGS

The forgoing and/or other objects features and advantages of the invention will become more apparent form the following description of a preferred embodiment with reference to the accompanying drawings in which like reference numerals designate like elements and wherein.

DETAILED DESCRIPTION OF PREFERRED EMBODIMENTS

Figure 1:
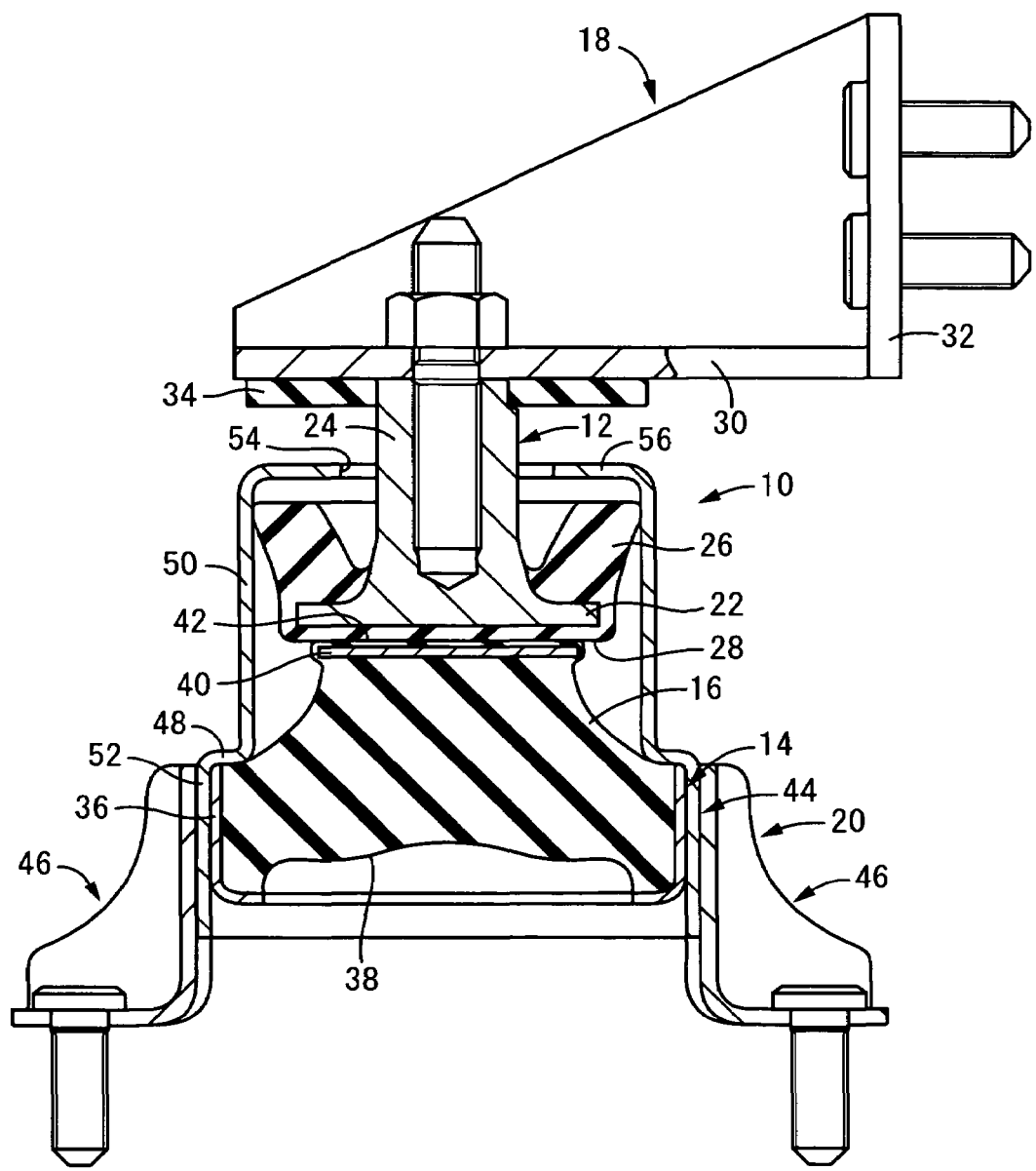
FIG. 1 is an elevational view in axial or vertical cross section of a fluid filled vibration damping device in the form of an engine mount of construction according to a first embodiment of the invention.

Referring first to FIG. 1, there is shown a fluid-filled vibration-damping device in the form of an engine mount 10 for automotive vehicles, which is constructed according to a first embodiment of the invention. The engine mount 10 has a structure comprising a rubber elastic body 16 disposed between a metallic first mounting member 12 fixable to a power unit (not shown), and a metallic second mounting member 14 fixable to a body of the vehicle (not shown). The first mounting member 12 is fixed via a power unit-side bracket 18 to the power unit, while the second mounting member 14 is fixed via a body-side bracket 20 to the body, so that the power unit is mounted on the body in vibration-damping fashion. With the engine mount 10 of this embodiment installed in this state, the engine mount 10 bears a weight or static load of the power unit exerted thereon in the generally vertical direction in FIG. 1, and exhibits effective damping action against vibration applied thereto in the generally vertical direction in FIG. 1 (i.e., an external load input direction).

More specifically, the first mounting member 12 includes a disk-shaped first abutting portion 22 and a fastener portion 24 of rod shape integrally formed with and projecting upward in the axial direction (upward in FIG. 1) from the disk-shaped first abutting portion 22. To the upper face of the first abutting portion 22, a cushion rubber 26 is bonded through vulcanization of a rubber material for forming thereof at a location where the fastener portion 24 is not disposed, that is, at the outer peripheral edge portion of the upper face of the first abutting portion 22, thereby providing a stop rubber that projects upward in the axial direction. This cushion rubber 26 provided as the stop rubber is formed with a generally uniform cross sectional shape all the way around the circumference, giving it a thick annular configuration overall. In this embodiment, the cushion rubber 26 has an inside diameter dimension and outside diameter dimension that increase gradually moving upwardly in the axial direction. The cushion rubber 26 also extends to the lower face of the first abutting portion 22, so that the lower face of the first abutting portion 22 is covered entirely by the extended portion of the cushion rubber 26. As a result, there is formed in the axially lower portion of the first mounting member 12 an overlapping face 28 composed of the portion of the cushion rubber 26 that extends over the lower face of the first abutting portion 22, and larger than the lower face of the first abutting portion 22 as well as being flat.

The first mounting member 12 of construction mentioned above is attached to the power unit via a power unit-side bracket 18. This power unit-side bracket 18 is formed of steel or other rigid materials, and is composed of a first mounting plate 30 for attachment of the first mounting member 12, and a second mounting plate 32 for attachment of the power unit. A reinforcing rib (not shown) is disposed between the first mounting plate 30 and the second mounting plate 32. The first mounting member 12 is bolted to the first mounting plate 30 of the power unit-side bracket 18 with the distal end face of the fastener portion 24 superimposed against the lower face of the first mounting plate 30, and then the power unit-bracket 18 is fixed onto the power unit by means of bolts provided at the second mounting plate 32, whereby the first mounting member 12 is secured to the power unit via the power unit-side bracket 18. To the lower face of the first mounting plate 32 is adhered an abutting rubber 34 of disk shape, so as to surround the fastener portion 24 fixed to the first mounting plate 30.

The second mounting member 14 has a cylindrical portion 36 of overall large-diameter cylindrical configuration, whose axially lower part is bent radially inwardly. The first mounting member 12 is disposed axially upwardly spaced away from the upper axial open end of the cylindrical portion 36 in a substantially concentric fashion. The rubber elastic body 16 is disposed between the first and second mounting members 12, 14, which are axially opposed to each other.

This rubber elastic body 16 is of generally frustoconical shape overall, having a recess 38 open in a large-diameter end face thereof, and bonded at an outer circumferential surface of its large-diameter end portion to an inner circumferential surface of the second mounting member 14, through vulcanization of a rubber material for forming the rubber elastic body 16.

A pressure receiving member in the form of a support plate 40 is superimposed onto and bonded to a small-diameter end face of the rubber elastic body 16 through the aforesaid vulcanization. This support plate 40 is formed of metal or other rigid materials, and has a thin circular disk shape overall with an outside diameter dimension smaller than that of the first abutting portion 22. In the present embodiment, the rubber elastic body 16, which is bonded by vulcanization to the lower face of the support plate 40, extends to the upper face of the support plate 40, whereby the entire upper face of the support plate 40 is coated by the portion extending from the rubber elastic body 16. As a result, there is formed at the small-diameter end of the rubber elastic body 16 an overlapping face 42 composed of the portion of the rubber elastic body 16 that extends over the upper face of the support plate 40, and larger than the lower face of the support plate 40 as well as being flat. In particular, the overlapping face 42 on the side of the rubber elastic body 16 is smaller than the overlapping face 28 on the side of the first mounting member 12. That is, the rubber elastic body 16 is formed as an integral vulcanization molded product comprising the second mounting member 14 and the support plate 40.

The second mounting member 14, as a component of the integral vulcanization molded product of the rubber elastic body 16, is attached to the body via the body-side bracket 20. This body-side bracket 20 includes a fastener member 44 and a plurality of leg portions 46 secured to the fixing member 44. The fastener member 44 is of thin-cylindrical configuration overall, and having an axially intermediate shoulder portion 48, a small-diameter portion 50 disposed on the axially upper side of the shoulder portion 48, and a large-diameter portion 52 disposed on the axially lower side of the shoulder portion 50. The axially upper end portion of the small diameter portion 50 of the fastener member 44 is bent radially inwardly, thereby providing a stopper plate 56 of annular configuration having a central hole 54, which is integrally formed at the axially upper end portion of the small diameter portion 50. In the present embodiment, the central hole 54 has a diameter dimension larger than the outside diameter dimension of the fastener portion 24 of the first mounting member 12. The plurality of leg portions are fixed by welding or the like to the large-diameter portion of the fastener member 44 of aforesaid construction, whereby the body-side bracket 20 is formed. In the present embodiment, the fastener member 44 and the leg portions 46 are both formed of a metallic material.

Into the large-diameter portion 52 of the body-side bracket 20, secured press fit is the second mounting member 14 as the component of the integral vulcanization product of the rubber elastic body 16. This body-side bracket 20 fixed with the second mounting member 14, is bolted at the leg portions thereof to the body of the vehicle, whereby the second mounting member 14 is attached to the body via the body-side bracket 20. In the present embodiment, the press-fit fixation of the second mounting member 14 into the large-diameter portion 52 of the body-side bracket 20 is executed after the first mounting member 12 being preset in its upright attitude within the small-diameter portion 50 of the body-side bracket 20.

With the first mounting member 12 housed within the small-diameter portion 50, the first mounting member 12 is attached to the power unit via the power unit-side bracket 18, while the second mounting member 14 is attached to the body via the body-side bracket 20, whereby the engine mount 10 is installed between the power unit and the body of the vehicle.

When the engine mount 10 is installed in position as described above, the fastener portion 24 of the first mounting member 14 extends axially upward through the central hole 54 of the body-side bracket 20, and situated axially upward of the stopper plate 56. Further, the overlapping face 28 of the first mounting member 12 is superimposed on the overlapping face 42 of the rubber elastic body 16, whereby the first mounting member 12 is superimposed on the rubber elastic body 16. In this installation state, the cushion rubber 26 is held in slidably contact with an inner circumferential surface of the small-diameter portion of the first mounting member 12, at its upper end portion, in particularly at its upper end peripheral edge portion all the way around the circumference thereof, whereby the first mounting member 23 is elastically positioned relative to the small diameter portion 50. With this arrangement of this embodiment, the first mounting member 12 can be concentrically positioned relative to the small diameter portion 50 and the second mounting member 14, thereby making it possible to concentrically superimpose the overlapping face 28 of the first mounting member 12 on the overlapping face 42 of the rubber elastic body 16, and to concentrically dispose the fastener portion 24 of the first mounting member 12 through the central hole 54 of the body-side bracket 20. Accordingly, the first mounting member 12 is superimposed on the rubber elastic body 16 in a concentric fashion, so that a static load or a distributed support load of the power unit is exerted on the rubber elastic body 16 in the axial direction of the second mounting member 14.

As is understood from the aforesaid description of the present embodiment, with the second mounting member 12 secured press-fit into the large-diameter portion 52 of the fastener member 44 of the body-side bracket 20, the small-diameter portion 50 of the fastener member 44 extends axially upward from the second mounting member 12, so that the small-diameter portion 50 functions as an extension portion. Further, the outer peripheral edge portion of the first abutting portion 22 of the first mounting member 12 provides a first abutting portion of the first mounting member, and the stopper plate 56 of the second mounting member 14 provides a second abutting portion of the second mounting member.

According to the engine mount 10 of construction as described above, the rubber elastic body 16 is formed independently of and superimposed on the first mounting member 12. With this arrangement, the engine mount 10 is able to exhibit effective anti-load capacity and vibration damping performance with respect to the distributed support load of the power unit or vibrational load, which are exerted thereon in the direction in which the first and second mounting members 12, 14 are moved toward each other. In addition, the engine mount 10 is capable of preventing the rubber elastic body 16 from being damaged from tensile stress induced therein and the resultant cracks or other defects occurred therein, when being subjected to relatively large load in the direction in which the first and second mounting members 12, 14 are moved away from each other.

Further, the support plate 40 is bonded to the small-diameter end face of the rubber elastic body 16 against which the first mounting member 12 is superimposed, whereby the rubber elastic body 16 exhibits shape stability at a location where the first mounting member 12 is superimposed against the rubber elastic body 16.

In this embodiment, the overlapping face 28 of the first mounting member 12 is made larger than that overlapping face 42 of the rubber elastic body 16. With this arrangement, if the position of the first mounting member 12 relative to the rubber elastic body 16 is off-centered in the axial-perpendicular direction of the second mounting member 14, when being superimposed against the rubber elastic body 16, the overlapping face 28 of the first mounting member 12 is still held in a state where the overlapping face 28 is superimposed over the entire area of the overlapping face 42 of the rubber elastic body 16. By means of this arrangement, the input direction of the distributed support load of the power unit or the vibrational load can be substantially conformed to the axial direction of the second mounting member 14.

Furthermore, since the cushion rubber 26 is held in slidable contact with the small diameter portion 50, the first mounting member 12 is substantially concentrically positioned relative to the small diameter portion 50 and the second mounting member 14, making it possible to conform the lower unit weight or load input direction to the axial direction of the second mounting member 14.

Preferably, the engine mount 10 is of a design that is developed on the premise that external load or vibration is input to the engine mount 10 substantially only in the axial direction of the frustoconical rubber elastic body 16 that substantially conforms to the axial direction of the second mounting member 14 that is bonded by vulcanization to the large-diameter side outer circumferential surface of the rubber elastic body 16. In this case, the principle of the invention is effectively practicable by means of a simple construction, namely by axially superimposing the first mounting member 12 on the rubber elastic body 16, without needing a specific stopper structure for limiting an amount of displacement of the first and second mounting member 12, 14 in the lateral direction, or without causing deterioration in its vibration damping performance due to an input load in the axis-perpendicular direction.

Since the engine mount 10 of this embodiment has the rubber elastic body 16 of generally frustoconical configuration, and is of the design that is developed on the premise that primarily external load or vibration is input thereto in the axial direction of the frustoconical rubber elastic body 16 that substantially conforms to the axial direction of the cylindrical portion 36 of the second mounting member 14, a spring stiffness exhibited in the axis-perpendicular direction of the cylindrical portion 36 of the second mounting member 14 is smaller than that exhibited in the axial direction of the cylindrical portion 36. Thus, it is conceivable that the engine mount 10 is not positively subjected to a relatively large input external load applied thereto in the axis perpendicular direction.

Contrary to the invention, in the case of a so-called "cylindrical mount" wherein a rubber elastic body is disposed between a metallic inner sleeve member and a metallic outer sleeve member disposed concentrically about the inner sleeve member as disclosed in JP-A-3-30736, for example, the cylindrical mount almost has a design that has been developed on the premise that external force is applied thereto in all diametric directions including horizontal or vertical direction when the mount is installed in positioned in its horizontal attitude with the center axes of the inner and outer sleeve members extending in the horizontal direction, when it is installed on the vehicle. While it is not depicted in the drawings, the power unit may be elastically positioned and supported with respect to the body of the vehicle via an engine mount or a roll mount which are interposed between the power unit and the body at other respective positions.

Figure 2:
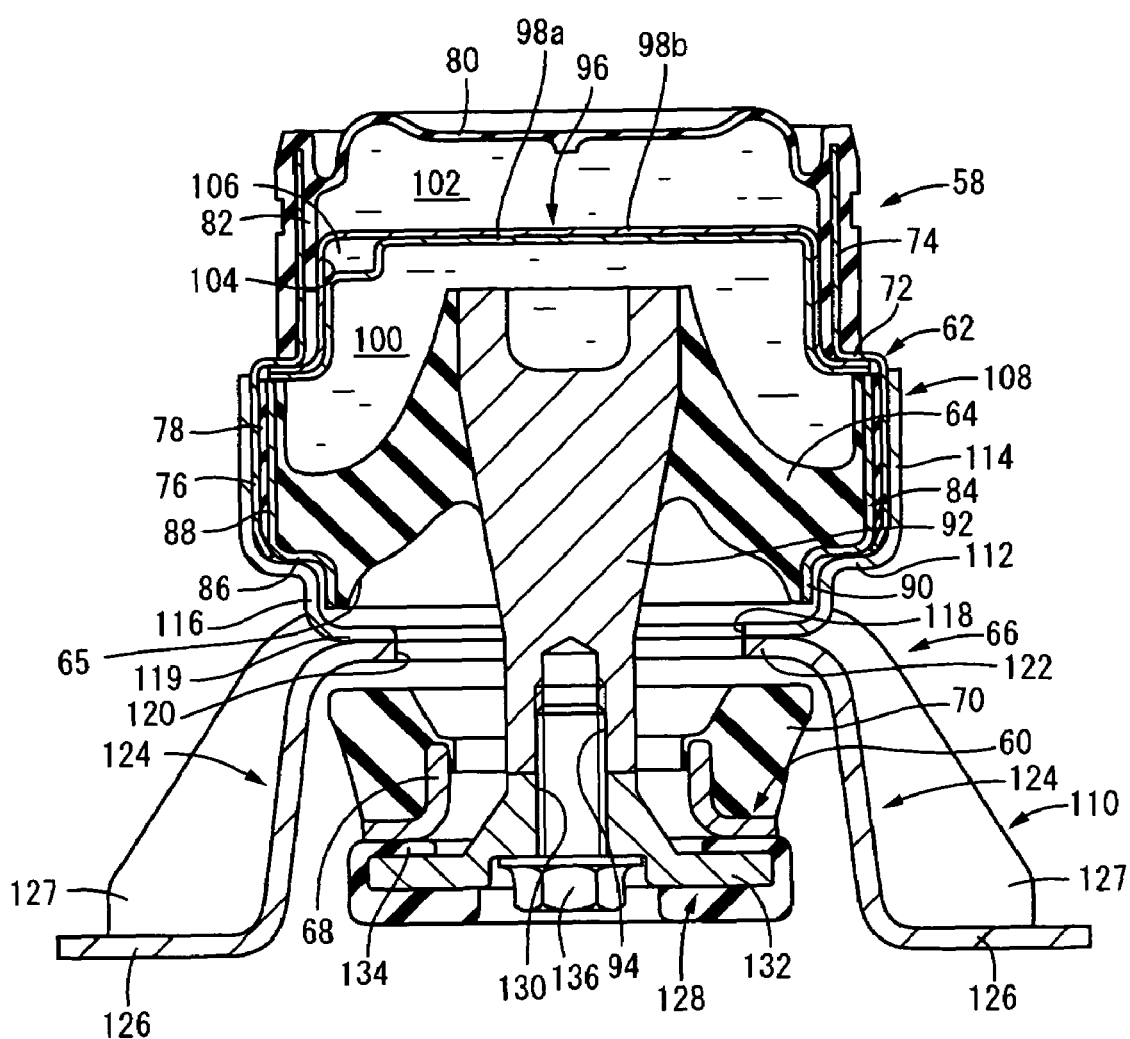
FIG. 2 is an elevational view in axial or vertical cross section of a fluid filled vibration damping device in the form of an engine mount of construction according to a second embodiment of the invention, taken along line 2—2 of FIG. 3.
Figure 3:
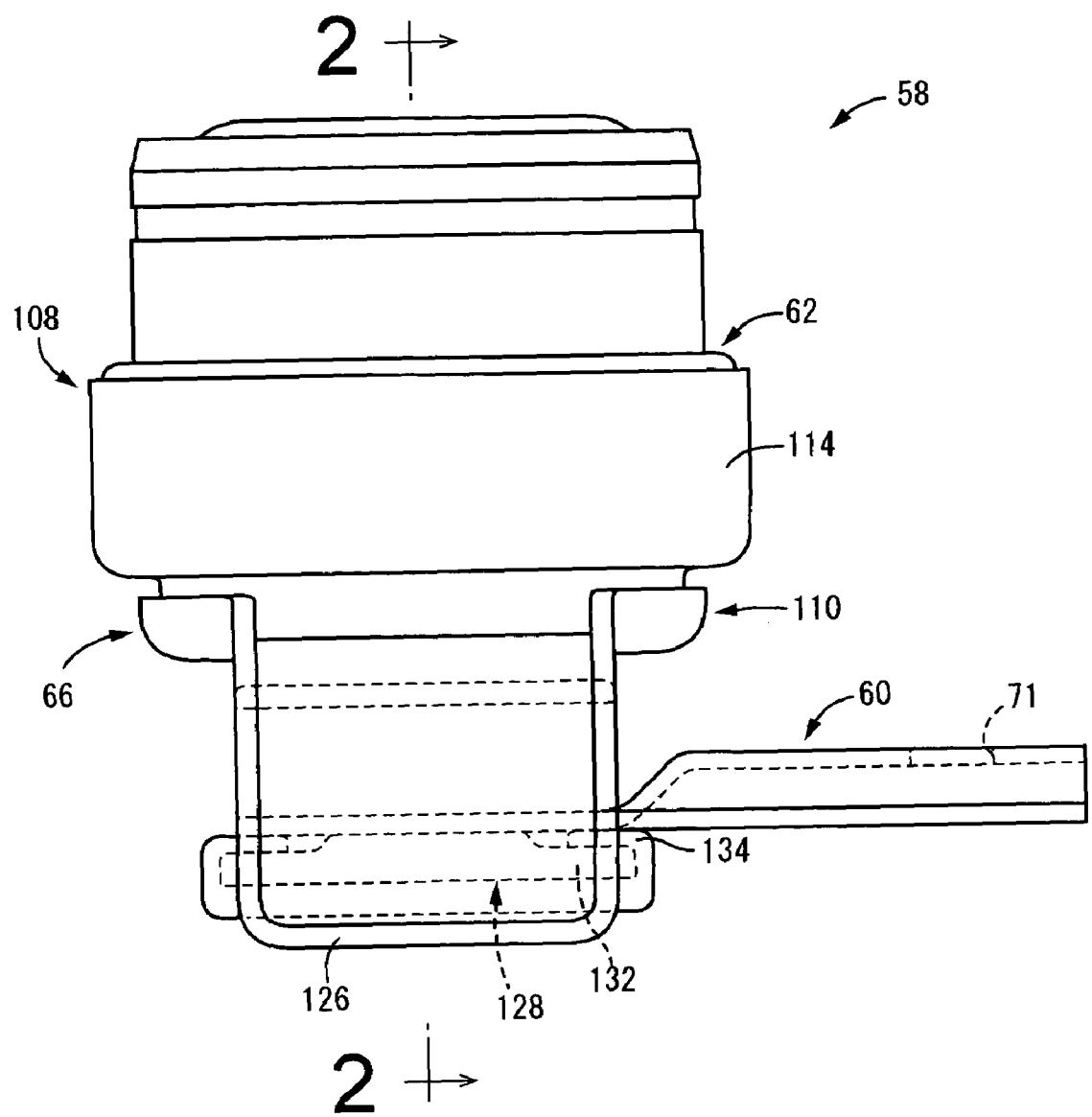
FIG. 3 is a right hand elevational view of the engine mount of FIG. 2.

Referring next to FIGS. 2 and 3, shown in a fluid filled vibration damping device in the form of an engine mount 58 constructed according to a second embodiment of the invention. The engine mount 58 has a structure comprising a rubber elastic body 64 disposed between a metallic first mounting member 60 fixable to the power unit (not shown), and a metallic second mounting member 62 fixable to the body of the vehicle (not shown). The first mounting member 60 is fixed to the power unit, while the second mounting member 62 is fixed via a body-side bracket 66 to the body, so that the power unit is mounted on the body in vibration-damping fashion. With the engine mount 58 of this embodiment installed in this state, the engine mount 58 bears a weight or static load of the power unit exerted thereon in the generally vertical direction of FIG. 2, and exhibits effective damping action against vibration applied thereto in the generally vertical direction in FIG. 2 (i.e., an external load input direction).

Described in detail, the first mounting member 60 has an overall long plate configuration, and includes a cylindrical portion 68 that is formed at a first lengthwise end thereof by means of a burring process so that the cylindrical portion 68 projects toward one side of a thickness-wise direction of the first mounting member 60, i.e., projects upwardly as seen in FIG. 2. A stop rubber in the form of a cushion rubber 70 is bonded through vulcanization of a rubber material for forming thereof to the first lengthwise end of the first mounting member 60, so as to cover an outer circumferential surface of the cylindrical portion 68 formed thereon. This cushion rubber 70 extends with generally uniform cross sectional shape all the way around its circumference, giving it a thick annular block configuration overall. In particular, the cushion rubber 70 has an inside diameter dimension and outside diameter dimension that increase gradually moving upwardly in the axial direction, with the projecting height thereof being greater than the axial length of the cylindrical portion 68. The cushion rubber 70 also extends to an inner circumferential surface of an upper opening of the cylindrical portion 68. The first mounting member 60 of construction mentioned above is fastened to the power unit by means of a bolt (not shown) passed through a bolt passage hole 71 formed in the other lengthwise end thereof (see FIG. 3).

The second mounting member 62, on the other hand, has an overall configuration which is a large-diameter cylinder, and includes a shoulder portion 72 formed in its axially medial portion, interposed between a small-diameter portion 74 situated axially above and a large-diameter portion 76 situated axially below. A thin sealing rubber layer is adhered to an inner circumferential surface of the large-diameter portion 76, while a diaphragm 80, which is formed of a rubber layer of thin disk shape, is disposed in an opening on the side of the small-diameter portion 74. The diaphragm 80 is bonded at its peripheral portion to an inner circumferential surface of the small-diameter portion 74, through vulcanization of a rubber material for forming thereof, whereby the opening on the side of the small-diameter portion 74 is provided with fluid-tight closure by the diaphragm 80. To the inner circumferential surface of the small-diameter portion 74 is adhered a sealing rubber layer 82 integrally formed with the diaphragm 80 in its entirety, and the peripheral edge of the diaphragm 80 extends to an outer circumferential surface of the small-diameter portion 74.

The first mounting member 60 is situated spaced away from the opening on the side of the large-diameter portion 76 of the second mounting member 62, and the rubber elastic body 64 is disposed between the first and second mounting members 60, 62.

This rubber elastic body 64 is of generally frustoconical shape overall, having a recess 65 open in a large-diameter end face thereof, and an outer fixing member 84 of thinwalled cylindrical configuration is bonded to an outer circumferential surface of the rubber elastic body 64 through vulcanization of a rubber material for forming the rubber elastic body 64. The outer fixing member 84 includes a shoulder portion 86 formed in its axially medial portion, interposed between a large-diameter portion 88 situated axially above and a small-diameter portion 90 situated axially below.

An inner fixing member 92 of solid rod shape is bonded at its one or upper axial end portion to the inner circumferential surface of the rubber elastic body 64 through the above mentioned vulcanization. The inner fixing member 92, more specifically, has an axially medial tapering portion that gradually increases in the outside diametric dimension moving axially upward. The inner fixing member 92 is formed at its lower end with a screw hole 94 that opens in its bottom face. With the upper axial end of the fixing member 92 is embedded within and bonded to the rubber elastic body 64 so as to extend through the central portion of the rubber elastic body 64, the opening on the side of the small diameter portion 90 of the outer fixing member 84 is fluid-tightly closed by means of the rubber elastic body 64. With the inner fixing member 92 is bonded through vulcanization to the rubber elastic body 64 as described above, the inner fixing member 92 is situated concentrically with the rubber elastic body 64 and the outer fixing member 84, and projects axially downwardly at its lower end portion from the opening on the side of the small-diameter portion 90 of the outer fixing member 84. As is understood from the preceding description, there is formed an integral vulcanization molding product of the rubber elastic body 64, having the inner fixing member 92 and the outer fixing member 84.

The thus formed integral vulcanization molding product of the rubber elastic body 64 is inserted into the large-diameter portion 76 of the second mounting member 62, and then the large-diameter portion 76 is subjected to a drawing operation or the like to be downsized in its diametric direction, whereby the outer fixing member 84 is secured press-fit into the second mounting member 62. With this arrangement, the opening on the side of the large-diameter portion 76 of the second mounting member 62 is provided with a fluid-tight closure by means of the rubber elastic body 64 and the inner fixing member 92, thereby providing a fluid sealing region inside the second mounting member 62.

A partition member 96 is housed within the small-diameter portion 74 of the second mounting member 62. This partition member 96 is constructed of two partition fittings 98a, 98b each of generally inverted cup shape formed by pressing or the like, and stacked on each other in the axial direction (hereinafter referred to as the upper and lower partition fittings 98a, 98b, where appropriate). This partition member 96 is held with the peripheral edges of the opening side thereof pinched between the rim of the opening of the large-diameter portion 88 of the outer fixing member 84 and the shoulder portion 72 of the second mounting member 62, thereby being housed and positioned within the small-diameter portion 138 of the second mounting member 124.

By situating the partition member 96 in the described manner, the fluid sealing region formed within the second mounting member 62 is partitioned into two sides in the axial direction (the rubber elastic body 64 side and the diaphragm 80 side). With this arrangement, there is formed on the axially lower side of partition member 96 a pressure receiving chamber 100 a portion of whose wall is partially constituted by the rubber elastic body 64, so as to undergo change in internal pressure on the basis of elastic deformation of the rubber elastic body 64 during vibration input. On the axially upper side of the partition member 96, on the other hand, there is formed an equilibrium chamber 102 a portion of whose wall is constituted by the diaphragm 80, and that readily permits change in volume based on elastic deformation of the diaphragm 80. Within the pressure receiving chamber 100 and the equilibrium chamber 168 is respectively sealed a non-compressible fluid such as water, alkylene glycol, polyalkylene glycol, silicone oil or the like.

The partition fittings 98a, 98b of the partition member 96 cooperate to define therebetween a circumferential space 104 located at a peripheral edge portion of its bottom wall portion and extending circumferentially over a given circumferential length. This circumferential space 104 is held in fluid communication at one end thereof with the pressure-receiving chamber 100 through a communication hole (not shown) formed through the lower partition fittings 98a, and at the other end thereof with the equilibrium chamber 102 through a communication hole (not shown) formed through the upper partition fittings 98b. The circumferential space 104 of construction stated above thereby provides an orifice passage 106 by which the pressure receiving chamber 100 and the equilibrium chamber 102 are held in fluid communication with each other, thereby permitting fluid to flow between the pressure receiving chamber 100 and the equilibrium chamber 102 through the orifice passage 106. The passage length, sectional area and other parameters of the orifice passage 106 are suitably determined so that effective vibration damping action against low frequency vibration, such as shaking or idling vibration, is exhibited on the basis of resonance or flow action of the fluid caused to flow through the orifice passage 106.

The second mounting member 62 assembled together with the integral vulcanization molding product of the rubber elastic body 64 is then attached to the body of the vehicle via the body-side bracket 66. This body-side bracket 66 is constructed of a first fastener member 108 and a second fastener member 110. The first fastener member 108 has the overall shape of a large-diameter cylinder having a shoulder portion 112 formed in its axially medial portion, with a large-diameter portion 114 situated axially above and a small-diameter portion 116 situated axially below. The small-diameter portion 116 is radially inwardly bent at its axially lower edge portion, thereby providing an integrally formed projecting portion 119 of annular plate shape, which defines at an inside peripheral edge thereof an through hole 118.

The second fastener member 110 is of generally gate shape overall, and includes a ceiling plate portion 122 of annular plate configuration having a center hole 120, and a pair of leg portions 124, 124 extending downward in the generally vertical direction from the ceiling plate portion 122, and integrally formed with the ceiling plate portion 122 at respective circumferential portions of the ceiling plate portion 122, which are diametrically opposite to each other. The pair of leg portions 124, 124 have the lower ends bending outwardly in the horizontal direction to form fastener plate portions 126, 126. In this embodiment, the diametrical dimension of the center hole 120 is of the same size as the diametrical dimension of the through hole 118. The diametrical dimension of the center hole 120 and the through hole 118 is sufficiently larger than the diametrical dimension of inner fixing member 92. A pair of reinforcing ribs 127, 127 are disposed on the second fastener member 110. The first fastener member 108 and the second fastener member 110 are formed of steel or other rigid material. The lower face of the projecting portion 119 of the first fastener member 108 is superimposed onto and welded to the upper face of the ceiling plate portion 122 of the second fastener member 110 in a concentric fashion, thereby constituting the body-side bracket 66.

The large-diameter portion 76 of the second mounting member 62 is secured press-fit into the large-diameter portion 114 of the body-side bracket 66 constructed stated above. With the second mounting member 124 fixed to the body-side bracket 128 in this way, the lower end of the inner fixing member 92 passes through the center hole 120 and the through hole 118, and projects down below the lower face of the ceiling plate 122. Then with the second mounting member 62 fixed to the body-side bracket 66, the fastener plate portions 126, 126 of the body-side bracket 66 are superimposed against and bolted to the body of the vehicle, thereby securing the second mounting member 62 to the body via the body-side bracket 66.

With the second mounting member 62 attached to the body of the vehicle via the body-side bracket 66 as stated above, the cylindrical portion 68 of the first mounting member 60 is externally fitted onto the inner fixing member 92, and a metallic stop member 128 is then affixed to the inner fixing member 92. This stop member 128 is of frustoconical shape overall, having a bolt hole 130 perforated axially therethrough, and integrally formed at the large-diameter end thereof a stop portion 132 of annular plate configuration projecting outward in its diametrical direction. To the upper face outside peripheral edge of the stop portion 132 is adhered an abutting rubber 134 of annular configuration. In this embodiment, the abutting rubber 134 extends as far as the lower face of the stop portion 132. The stop member 128 is superimposed with the small-diameter end face against the lower end face of the inner fixing member 92, and is bolted to the inner fixing member 92 by means of a bolt 136 threaded within the screw hole 94. In this embodiment, the portion of the abutting rubber 134 extending as far as the lower face of the stop portion 132 has a thickness dimension enough to avoid projecting out of the head of the bolt 136 downward in the axial direction.

With the first lengthwise end of the first mounting member 60 positioned on the stop portion 132 of the stop member 128 secured to the inner fixing member 92, the first mounting member 60 is fastened to the power unit at the other longitudinal end portion, whereby the power unit is supported on the body of the vehicle via the engine mount 58 in a vibration damping fashion.

In this embodiment, with the engine mount 58 installed between the power unit and the body of the vehicle, the first lengthwise end of the first mounting member 60 is positioned on the stop portion 132 via the abutting rubber 134, with the cylindrical portion 68 positioned concentrically with the inner fixing member 92, and with the cushion rubber 70 projecting upward in the axial direction. Accordingly, the distributed support load of the power unit is input to the rubber elastic body 64 in the generally axial direction.

With the first lengthwise end of the first mounting member 60 positioned on the stop portion 132 via the abutting rubber 134 as stated above, the cushion rubber 70 is positioned concentrically opposite to the ceiling plate 122, with the outside peripheral edge of the axial upper end thereof not abutting the leg portions 122, 122 as long as vibration is not input.

The portion of the abutting rubber 134 that extends as far as the lower face of the stop member 132 is positioned above the lower faces (mounting faces) of the fastener plate portions 126, 126 of the pair of leg portions 124, 124, thereby permitting elastic deformation of the rubber elastic body 126 in the axial direction.

As is understood from the preceding description, in this embodiment, the stop member 128 and the inner fixing member 92 cooperate to provide a pressure receiving member, and the large-diameter portion 76 of the second mounting member 62 provides a cylindrical portion. Also, in this embodiment, the large-diameter portion 76 of the second mounting member 62 is secured press-fit into the large-diameter portion 114 of the second fastener member 110, so that the small-diameter portion 116 of the second fastener member 110, which projects our from the large-diameter portion 76 of the second mounting member 62, constitutes an extension portion. It should further be noted that a portion of the first mounting member 60 that surrounds the cylindrical portion 68 functions as a first abutting portion of the first mounting member 60, and the ceiling plate portion 122 superimposed against the projecting portion 119 of the first fastener member 108 functions as a second abutting portion of the second mounting member 62. Also, in this embodiment, a fluid chamber is composed of the pressure-receiving chamber 100 and the equilibrium chamber 102.

In the engine mount 58 of the construction described above, the first mounting member 60 is formed independently of the rubber elastic body 64, and the first mounting member 60 is disposed in position while being superimposed from the side of the rubber elastic body 64 onto the stop portion 132 of the stop member 128 constituting the pressure receiving member. With this arrangement, when being subjected to an extremely large input load in the direction where the first mounting member 60 and the second mounting member 62 are spaced away from each other, the engine mount 58 is able to prevent the non-compressible fluid sealed in the pressure-receiving chamber 100 from functioning restricting member that prevent elastic deformation of the rubber elastic body 64. Thus, the engine mount 58 is capable of avoiding increase in the dynamic spring constant of the rubber elastic body 64 and resultant deterioration in its damping performance.

Further, the engine mount 58 of construction according to this embodiment, is able to avoid generation of air bubbles in the non-compressible fluid due to separation of air component contained in the non-compressible fluid from the fluid, which are caused by negative pressure generated in the pressure-receiving chamber 100. As a result, avoided are noises and impact caused by appearance and disappearance of the bubbles. Also, the vibration-damping device of this mode is free from the problem of insufficient increase in interior pressure of the pressure-receiving chamber 100 which may be occurred by means of compression of the bubbles during input of vibrational-load, allowing the vibration damping device to be free from malfunction of its intended damping performance.

In the engine mount 58 designed so as to exhibit damping effect with respect to input vibration applied thereto substantially in the axial direction of the frustoconical rubber elastic body 64 that substantially conforms to the axial direction of the second mounting member 62, is free from a conventionally experienced problem, i.e., deterioration of intended vibration damping effect due to action of non-compressible fluid sealed therein, when the rubber elastic body 64 undergoes a relatively large tensile deformation in the vibration input direction, by means of the simple and unique construction of the present embodiment wherein the first mounting member 60 formed independently of the rubber elastic body 64 is superimposed on the stop portion 132 of the stop member 128 bonded to the rubber elastic body 64 via the inner member 92. That is, with the simple and unique construction of the present embodiment, the engine mount 58 is able to exhibit desired vibration damping effect with stability, while preventing excess tensile deformation of the rubber elastic body.

Still further, in this embodiment, the first mounting member 60 is superimposed on the stop portion 132 of the stop member 128 secured to the lower end of the inner fixing member 92, with the cylindrical portion 68 of the first mounting member 60 being disposed about the fixing member 92 extending therethrough. By means of this arrangement, an amount of displacement of the first mounting member 60 relative to the inner fixing member 92 in the axis-perpendicular-direction is effectively limited, thereby making it possible to keep the first mounting member 60 superimposed on the stop portion 132 while being displaceable spaced away from the stop portion 132.

Further, in this embodiment, since the cushion rubber 70 disposed on the first mounting member 60 is positioned in juxtaposition of the ceiling plate 122 therebelow in the axial direction, the amount of axial upward displacement of the first mounting member 60 away from the stop portion 132 is restricted in a cushionwise manner.

While the presently preferred embodiment of the invention has been discussed above for the illustrative purpose only, it should be appreciated that the present invention is not limited to the details of the illustrated embodiment.

While the present invention is applied to an engine mount for use in automobiles in the illustrated first and second embodiments, the principle of the invention is applicable to a body mount or other mounts for automobiles or other devices, likewise.

The extension portion may have a variety of configurations other than the cylindrical configuration employed in the illustrated first and second embodiments. For instance, the extension portion may be composed of members arranged in the circumference of the cylindrical portion of the second mounting member with a spacing therebetween, e.g., a pair of plate members that are situated at diametrically opposite circumferential positions of the cylindrical portion of the second mounting member, and extend axially outwardly from the cylindrical portion.

It is also to be understood that the present invention may be embodied with various other changes, modifications and improvements, which may occur to those skilled in the art, without departing from the spirit and scope of the invention defined in the following claims.

What is claimed is:

1. A vibration damping device interposed between a first member and a second member to be connected in a vibration damping manner, comprising:
    a first mounting member connectable to the first member, the first member being a vibration member;
    a second mounting member connectable to the second member, the second member connected to the vibration member in a vibration damping manner, and having a cylindrical portion; and
    a rubber elastic body of generally frustoconical configuration overall, and disposed between the first and second mounting members such that the second mounting member is connected at an inner circumferential surface of the cylindrical portion thereof to a large diameter side outer circumferential surface of the rubber elastic body, and the first mounting member is separably coupled directly or indirectly to a small diameter end face of the rubber elastic body so as to exert an external load on a central portion of the rubber elastic body,
    wherein the first mounting member has a first abutting portion, and the second mounting member has a second abutting portion the second abutting portion being situated to be opposed to the first abutting portion with a given distance interposed therebetween in a rebound direction where the first and second mounting members move axially away from each other, and a stop rubber is bonded to at least one of the first and second abutting portions so that the stop rubber is disposed between the first and second abutting portions to provide a stopper structure, and
    wherein, upon input of the external load in the rebound direction, the first and second mounting members are held in a separated state with no connection therebetween, and in the stopper structure, the first and second abutting portions are brought into abutment with each other with the stop rubber compressed therebetween to thereby limit an amount of displacement between the first and second mounting members relative to each other in the rebound direction.

2. A vibration damping device according to claim 1, wherein the first mounting member is superimposed on a small diameter end face of the rubber elastic body.

3. A vibration damping device according to claim 1, further comprising a pressure receiving member that is bonded to the small-diameter portion of the rubber elastic body, and the first mounting member is superimposed on the pressure-receiving member so that the external input load is exerted via the first mounting member on the central portion of the rubber elastic body.

4. A vibration damping device according to claim 3, wherein the pressure receiving member is disposed at a central portion of the rubber elastic body, and axially extending through the rubber elastic body so as to project out from a large-diameter end face of the rubber elastic body, and wherein the first mounting member is superimposed on a projecting end portion of the pressure receiving member from the side of the rubber elastic body so that the external load is indirectly exerted on the central portion of the rubber elastic body via the pressure receiving member.

5. A vibration damping device according to claim 3, wherein an overlapping face area of the first mounting member against the pressure-receiving member is larger than an overlapping face area of the pressure-receiving member against the first mounting member.

6. A vibration damping device according to claim 1, wherein the second mounting member includes an extension portion extending axially outwardly from the cylindrical portion of the second mounting member fixed onto the large diameter side outer circumferential surface of the rubber elastic body, toward the first mounting member, and the second abutting portion of the second mounting member is formed by an distal end portion of the extension portion of the second mounting member that is situated axially above and opposed to the first abutting portion of the first mounting member, while the first mounting member is elastically positioned relative to the extension portion of the second mounting member in an axis-perpendicular direction of the cylindrical portion of the second mounting member via the stop rubber disposed between the first abutting portion and the second abutting portion.

7. A vibration damping device according to claim 6, wherein the stop rubber is of annular configuration overall, and the extension portion is of annular configuration and disposed about the stop rubber with a distal end portion being slidably held in contact with an inner circumferential surface of the extension portion all the way around a circumference thereof so that the stop rubber and the extension portion is concentrically situated to each other.

8. A vibration damping device according to claim 1, further comprising a fluid chamber partially defined by the rubber elastic body and filled with a non-compressible fluid sealed therein, and the device exhibiting vibration damping effect based on flow action of the non-compressible fluid generated within the fluid chamber during input of vibrational load.

* * * * *

UNITED STATES PATENT AND TRADEMARK OFFICE
CERTIFICATE OF CORRECTION

| | | |
|---|---|---|
| PATENT NO. | : 7,140,603 B2 | |
| APPLICATION NO. | : 10/873778 | |
| DATED | : November 28, 2006 | |
| INVENTOR(S) | : Maeno et al. | |

It is certified that error appears in the above-identified patent and that said Letters Patent is hereby corrected as shown below:

In the Title Page:

Item "(56) References Cited" section, under "U.S. Patent Documents," please change "6,558,737" to --6,588,737--.

Signed and Sealed this

Eighth Day of May, 2007

JON W. DUDAS
*Director of the United States Patent and Trademark Office*